Oct. 26, 1971  A. L. PADDINGTON  3,615,107
PIPE COUPLINGS

Filed Aug. 12, 1969  2 Sheets-Sheet 1

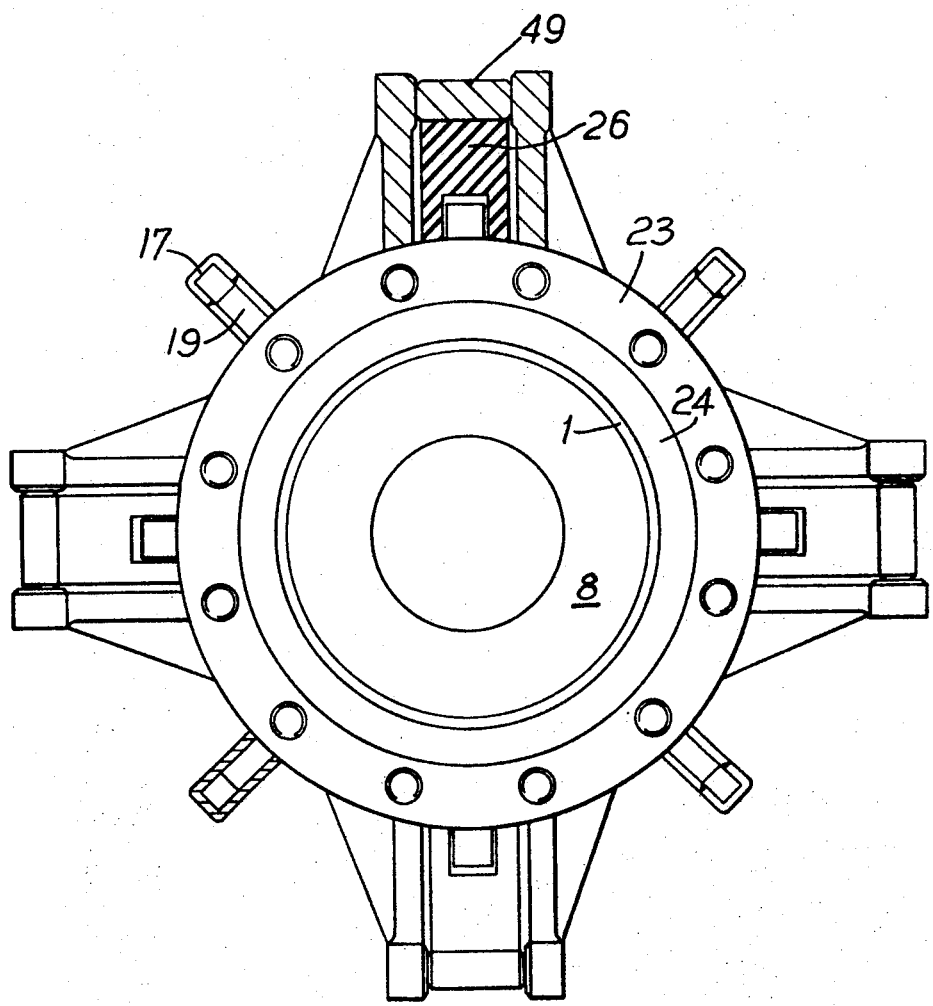

United States Patent Office 3,615,107
Patented Oct. 26, 1971

3,615,107
PIPE COUPLINGS
Arthur L. Paddington, Thorpe Willoughby, near Selby, England, assignor to British Ropes Limited, Doncaster, Yorkshire, England
Filed Aug. 12, 1969, Ser. No. 849,391
Claims priority, application Great Britain, Aug. 13, 1968, 38,726/68
Int. Cl. F16l 23/00
U.S. Cl. 285—18                                      5 Claims

ABSTRACT OF THE DISCLOSURE

A pipe coupling for connecting together a pair of flanged pipes, comprising several arms pivoted on a support member arranged in screw-threaded engagement with one pipe behind its end flange so that it is axially movable on the pipe, each arm carrying a latch engageable behind the end flange of the other pipe to hold the two pipes together, the latches being adjustable on the arms to suit end flanges of different size.

---

This invention relates to pipe couplings.

It is an object of the invention to provide means for holding in coupled relationship two opposed pipe flanges.

According to the invention, coupling means for flanged pipes comprises a plurality of arms pivoted on a support member adapted to be retained behind a flange on one pipe so that they can swing towards and away from the pipe axis, each arm carrying a latch engageable behind a flange on another pipe to hold it in coupled relationship with the first said flange, which latch is adjustable relative to the arm to suit flanges of different diameters and/or thicknesses.

The support member is preferably axially adjustable (e.g. by a screw-threaded connection) relative to the flange behind which it is retained. Thereby allowance can be made for variations in thickness of flanges on pipes to be coupled.

The latch on each arm is preferably longer than it is wide. It is preferably movable lengthwise in radial direction relative to the pipes in a guide way in the arm, locating means (e.g. a pin passing through holes in the latch and the arm) being provided for holding the latch in two or more different positions along the guideway.

The latch may be removable from the guideway, means being provided for locating the latch in one or more positions outside the guide way with the longitudinal axis of the latch parallel or substantially parallel to the pipe axis.

The invention also provides a pipe coupling comprising two flanged pipes held together by coupling means as set out above. If desired an adaptor ring as described in my co-pending patent application Ser. No. 797,151, filed Feb. 6, 1969 may be interposed between the coupled flanges.

The following is a description, by way of example, of one embodiment of coupling means in accordance with the invention, reference being made to the accompanying drawing in which:

FIG. 2 is a cross-section through a pipe shownig the disposition of the arms and latches of the coupling means.

Figure 1:
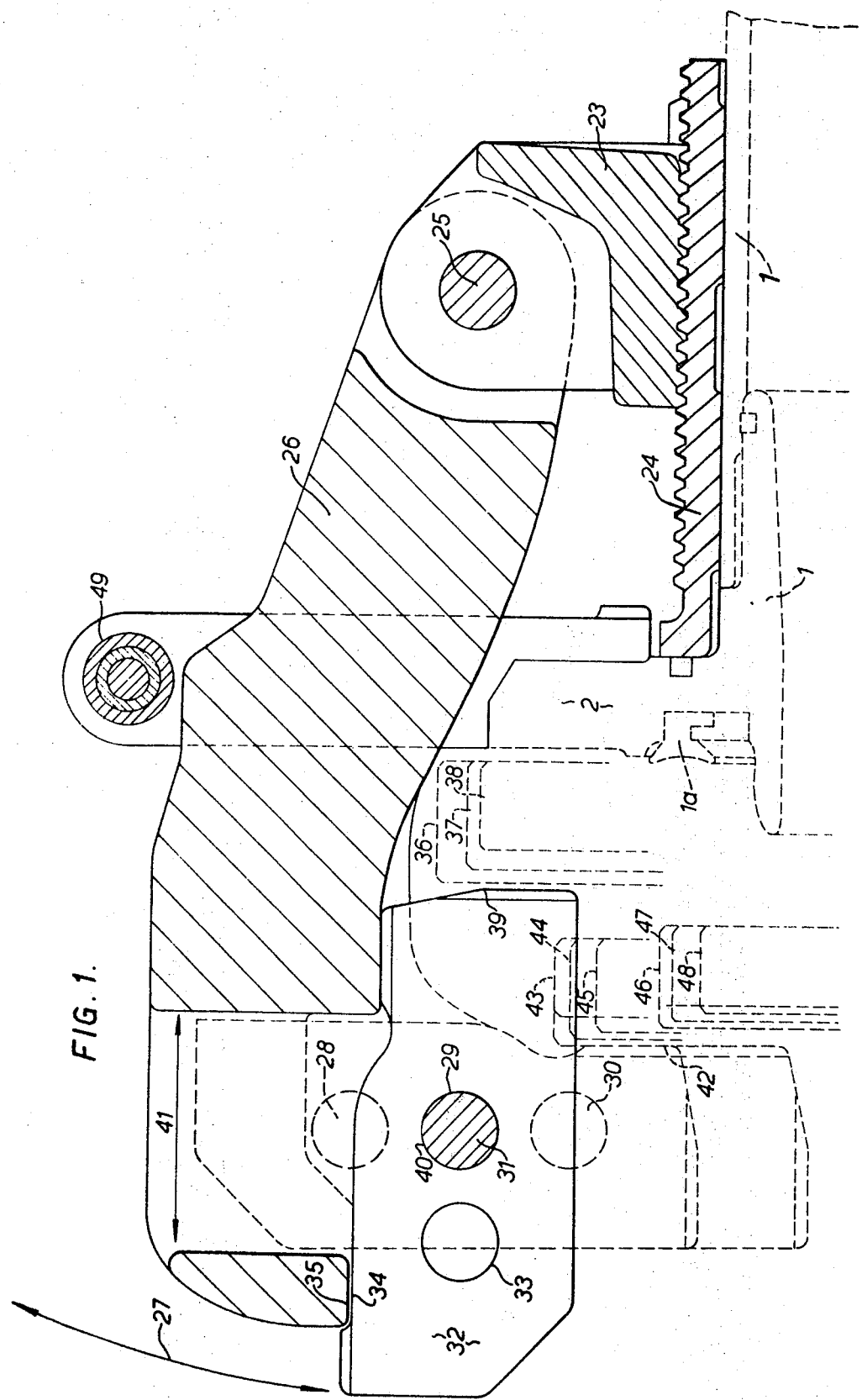
FIG. 1 is a radial section through part of the coupling means.

Referring to the drawings there is shown in broken lines a pipe 1 having a terminal flange 2 fitted with a sealing ring 1a as described in my co-pending patent application Ser. No. 797,151. A ring 23 is mounted in screw-threaded engagement on a collar 24 which surrounds the pipe and engages behind the flange 2. At each of four equi-spaced positions round the ring 23 there is provided a pivot pin 25 on which is pivoted one end of a latching arm 26 so that the arm can be swung along path 27 in a radial plane through the pipe axis. The arm has a through slot 41 and is provided with three spaced bores 28, 29 and 30 intersecting the slot. A latch 32, which is longer than it is wide and has a width such that it can be fitted into the slot, is connected to the arm by a pin 31 and may be used in the following ways:

(1) The latch 32 may be employed with its longitudinal axis parallel to the pipe axis, as shown in full lines in the drawing. The latch is held in that position by passing the pin 31 through the bore 29 in the arm 26 and a registering hole 40 in the latch. Movement of the latch out of position is prevented by a contoured surface 34 on the latch bearing upwards against a surface 35 on the arm 26. A working face 39 at one end of the latch bears against the rear of a flange 36, 37 or 38 of large diameter on a pipe to be coupled to the pipe 1. By suitable axial positioning of the ring 23 on the collar 24 by using the screw-threaded connection therebetween, the flange 36, 37 or 38 can, regardless of its thickness, be held firmly against the sealing ring 1a.

As shown in the drawing, the flanges 36, 37 and 38 vary in diameter and thickness.

(2) Connection of pipe flanges with smaller diameters may be achieved by withdrawing the pin 31, turning the latch through 90°, inserting it in the slot 41, and securing it in position by passing the pin through the hole 40 or a spaced hole 33 in the latch and through one of the bores 28, 29, 30. Since there are two spaced holes in the latch and three spaced bores in the arm, six different latch positions are available for use. The radially outer part of the latch is retained in the slot 41 while a bearing surface 42 at the nose of the latch engages the rear of a flange 43, 44, 45, 46, 47 or 48 on a pipe to be coupled to hold that flange firmly against the sealing ring 1a. As shown in the drawing, the flanges vary in diameter and thickness. Variation in thickness can be allowed for as before by adjusting the ring 23 on the collar 24.

An adaptor ring 8, FIG. 2, as described in co-pending patent application, Ser. No. 849,392, filed Aug. 12, 1969, may if desired be used between the coupled flanges. In that case, toggle mechanisms 17, 19 may, if desired, be used to secure the adaptor ring 8 to the flange 2 as described in the same application.

Although in the arrangement shown in the drawing, four equi-spaced latching arms 26 are provided, a different number may be used. For example, there may be only three equi-spaced latching arms.

A roller 49 may be provided for engaging each latching arm 26 and forcing the latch down on to the flange.

I claim:

1. Coupling means for flanged pipes, comprising a support member adapted to be retained behind a flange on one of a pair of pipes to be coupled, a plurality of arms pivoted on the support member so that they can swing towards and away from the pipe axis, and a latch carried by each arm and engageable behind a flange on the other of the pair of pipes to hold said other pipe in coupled relationship with the first said pipe, each latch being movable lengthwise in radial direction relative to the pipes in a guideway in the arm, and being removable from the guideway, locating means being provided for holding the latch in at least two different positions along the guideway and means being provided for locating the latch in at least one position outside the guideway with the longitudinal axis of the latch substantially parallel to the pipe axis, whereby the latches are adjustable relative to the arms to suit pipe flanges of different size.

2. Coupling means according to claim 1, wherein the support member is axially adjustable relative to the flange behind which it is retained.

3. Coupling means according to claim 1 wherein the latch on each arm is longer than it is wide.

4. Coupling means as set forth in claim 1 in which each said latch includes working faces disposed substantially 90° from each other for engaging behind a flange on the other of the pair of pipes depending upon the position of said latch.

5. Coupling means as set forth in claim 1 in which said latch includes at least a pair of locating apertures and said means cooperative with said locating apertures for locating the latch in at least two positions outside the guideway with the longitudinal axis of the latch substantially parallel to the pipe axis.

References Cited
UNITED STATES PATENTS

| | | | |
|---|---|---|---|
| 1,474,995 | 11/1923 | Burroughs | 285—177 X |
| 1,897,142 | 2/1933 | Peterson | 24—248 |
| 1,910,706 | 5/1933 | Malzard | 285—320 X |
| 3,445,127 | 5/1969 | Clarke | 285—320 X |

THOMAS F. CALLAGHAN, Primary Examiner

U.S. Cl. X.R.

285—320, 364